United States Patent
Liang

(10) Patent No.: US 9,887,506 B1
(45) Date of Patent: Feb. 6, 2018

(54) MODULARIZED JUNCTION BOX

(71) Applicant: Rue-Lan Liang, Fresno, CA (US)

(72) Inventor: Rue-Lan Liang, Fresno, CA (US)

( * ) Notice: Subject to any disclaimer, the term of this patent is extended or adjusted under 35 U.S.C. 154(b) by 0 days.

(21) Appl. No.: 15/405,258

(22) Filed: Jan. 12, 2017

(51) Int. Cl.
- H01R 13/66 (2006.01)
- H01R 33/97 (2006.01)
- H01R 13/73 (2006.01)
- H01R 4/48 (2006.01)

(52) U.S. Cl.
CPC ......... *H01R 33/971* (2013.01); *H01R 4/4818* (2013.01); *H01R 13/73* (2013.01)

(58) Field of Classification Search
CPC ..... H01R 13/73; H01R 4/4818; H01R 33/971
USPC .................. 439/373, 535, 817, 819
See application file for complete search history.

(56) References Cited

U.S. PATENT DOCUMENTS

| | | | | |
|---|---|---|---|---|
| 6,544,049 B1* | 4/2003 | Pierson, Jr. | ............ | H01R 29/00 439/107 |
| 6,558,190 B1* | 5/2003 | Pierson, Jr. | ............ | H01R 9/226 439/535 |
| 6,843,680 B2* | 1/2005 | Gorman | ............... | H01R 31/065 439/535 |
| 7,110,534 B1* | 9/2006 | Mullaney | ............. | H01R 9/2433 379/325 |
| 7,367,121 B1* | 5/2008 | Gorman | ............... | H01R 13/652 174/53 |
| 7,767,905 B2* | 8/2010 | Meyer | .................... | H02G 3/086 174/135 |
| 8,804,314 B2* | 8/2014 | Kamo | ................. | B60R 16/0238 361/641 |
| 2003/0171039 A1* | 9/2003 | Pierson, Jr. | ............... | H01R 9/22 439/709 |
| 2006/0105626 A1* | 5/2006 | Scott | .................... | H01R 9/2491 439/535 |
| 2006/0216988 A1* | 9/2006 | Scott | .................... | H01R 9/2433 439/535 |
| 2012/0094511 A1* | 4/2012 | Sil | ........................ | H01R 13/443 439/107 |
| 2015/0357762 A1* | 12/2015 | Green | .................. | H01R 13/652 439/95 |

* cited by examiner

*Primary Examiner* — Abdullah Riyami
*Assistant Examiner* — Nelson R Burgos-Guntin
(74) *Attorney, Agent, or Firm* — Chun-Ming Shih

(57) ABSTRACT

The invention provides a junction box with several switchable function modules. The junction box has a box container providing the input of plurality of external wires. There are several wire connectors positioned inside the box container, wherein each of the wire connector having a first opening and a second opening, each of the second openings is provided for accommodating one of the external wires. In addition, a box cover having a function module is provided for being mounted on the box container. Once the box cover being mounted on the box container, plurality of contact pins set on the box cover would be inserted into the first openings of the wire connectors then the contact pins would be in electrical communication with the external wires. Therefore, the function module, which is in connection with the contact pins, would be activated.

12 Claims, 10 Drawing Sheets

MODULARIZED JUNCTION BOX

BACKGROUND OF THE INVENTION

1. Field of the Invention

The present disclosure relates to a modularized junction box, especially a junction box having several convenient wire connectors and having a box cover which is replaceable for required functions.

2. Description of the Prior Art

Switches and plug sockets can be considered as necessary equipment in a house or a firm; for obtaining power and maintaining its function, the switch or the plug socket necessitate to be correctly connected to the electrical wires in the wall. Though once the electrical wiring of a switch or a plug socket is accomplished, it would not be amended often; however, it at the same time means that its function cannot be amended easily as well.

When a switch or a plug socket does not work, or necessary maintenance is required, to a person have no related skill, a paid professional service may needed. On the other hand, though to a person who has professional wiring skill, the wiring of a switch or a plug socket is fixed, if you like to change current module to others, re-wiring is inevitable. The limitations of conventional techniques or junction boxes are quite obvious; hence an innovation junction box that provides quick connecting mechanism to wires or modules of different functions can definitely meet the demand.

SUMMARY OF THE INVENTION

Present invention discloses a junction box, which is applied for establishing quick wiring and for providing changeable modularized function modules subject to different functions. The junction box is developed to overcome the drawbacks of conventional technique.

Present invention is a junction box, the junction box comprising a box container which is provided to contain the components of the junction box. The box container is manufactured without a constant cover. Moreover, at least one opening is set on the side walls or the bottom of the container box, providing the paths for plurality of external wires can be inserted into the box container.

Present invention further having plurality of wire connectors disposed on predetermined positions inside the box container, usually on the inner side walls of the box container, wherein each of the wire connector further having following parts:

A container, having a first opening and a second opening set on its surface, wherein the first opening is disposed for accommodating a contact pin and the second opening is disposed for accommodating an end of said external wires;

A conducting unit made by electrical conductive materials, such as copper or bronze. The conducting unit is set inside the container where closed to the first opening on the container. When inserted contact pin accommodated by the first opening of the container, the contact pin contacts to the conducting unit;

A compress unit set inside the container, wherein the compress unit is provided for clamping a side of the conducting unit with the end of the external wire which is inserted from the second opening, so that a conduct pathway from the external wire to the contact pin is made.

The wire connector is constructed by the aforementioned three parts, which provided a much safer solution for average people to establish electrical wiring.

Moreover, the junction box further comprising a box cover, which is provided to mount on said box container, the box cover is characterized in that plurality of contact pins are positioned at the down side (opposite to the surface) of the box cover, each of the contact pin is located correspond to a first opening of one of the wire connectors so that each of the contact pin can be inserted and accommodated in a wire connector when the box cover is mounted on the box container.

The positions of where the wire connectors and the plurality of the contact pins should be set are correspondingly arranged, such as, disposed odd and even wire connectors respectively on the opposite side walls of the box container, and arranged the corresponding numbers of contact pins on the opposite edges under the box cover. Because of the limitation above, the box cover and the box container can only be assembled along a single direction. The corresponding arrangement is set to prevent the inadvertent mounting error.

Furthermore, a function module is set on the box cover, and the function module is selectively connected with the contact pins according to the predetermined function of the function module. The function module can be a module of single switch module, a module of multiple switch, a module of light detecting switch, a module of sound detecting switch, a module of ground fault circuit interrupter switch, a module of time switch, a module of slide switch, a module of press switch, a module of touch switch, a module of turn switch or a module of plug socket, etc.

As mentioned, present invention herein provides a modularized box cover connected with the function module, which is changeable or selectable subject to the requirement of user.

Wherein each of the wiring connector is disposed for making a contact between the contact pin inserted from the first opening and one of the external wires input from the second opening when the box cover mounted on the box container;

In summary, the junction box of present invention is a simple but efficient product, provided to both professional and average people for electrical wiring. User of the junction box can simply pull out the electrical wires from the wall and insert into the box container through the opening thereon, then manipulate the compress unit of the wire connector for clamping the electrical wires with the conducting unit, then the wiring process is completed.

Compare to conventional techniques, the wiring process of present invention is rather simple, and the functions of the junction box can be easily changed by switching different modularized box covers. It is indeed a convenient and time-saving design to establish electrical wiring.

DETAILED DESCRIPTION OF THE PREFERRED EMBODIMENT

The present invention of the modularized junction box will be described in embodiments with figures hereinafter.

Figure 1:
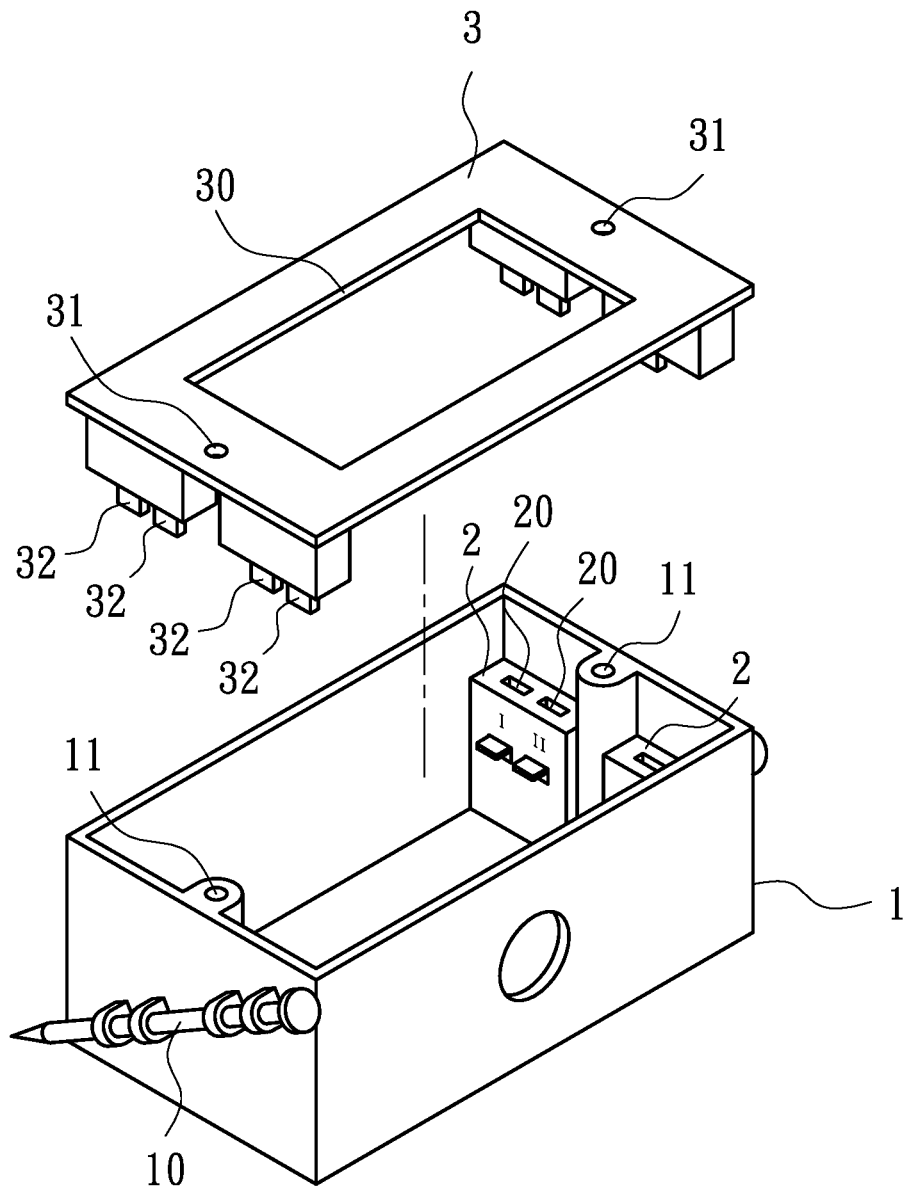
FIG. 1 is a schematic diagram illustrating the exterior of the box container and the box cover.
Figure 2:
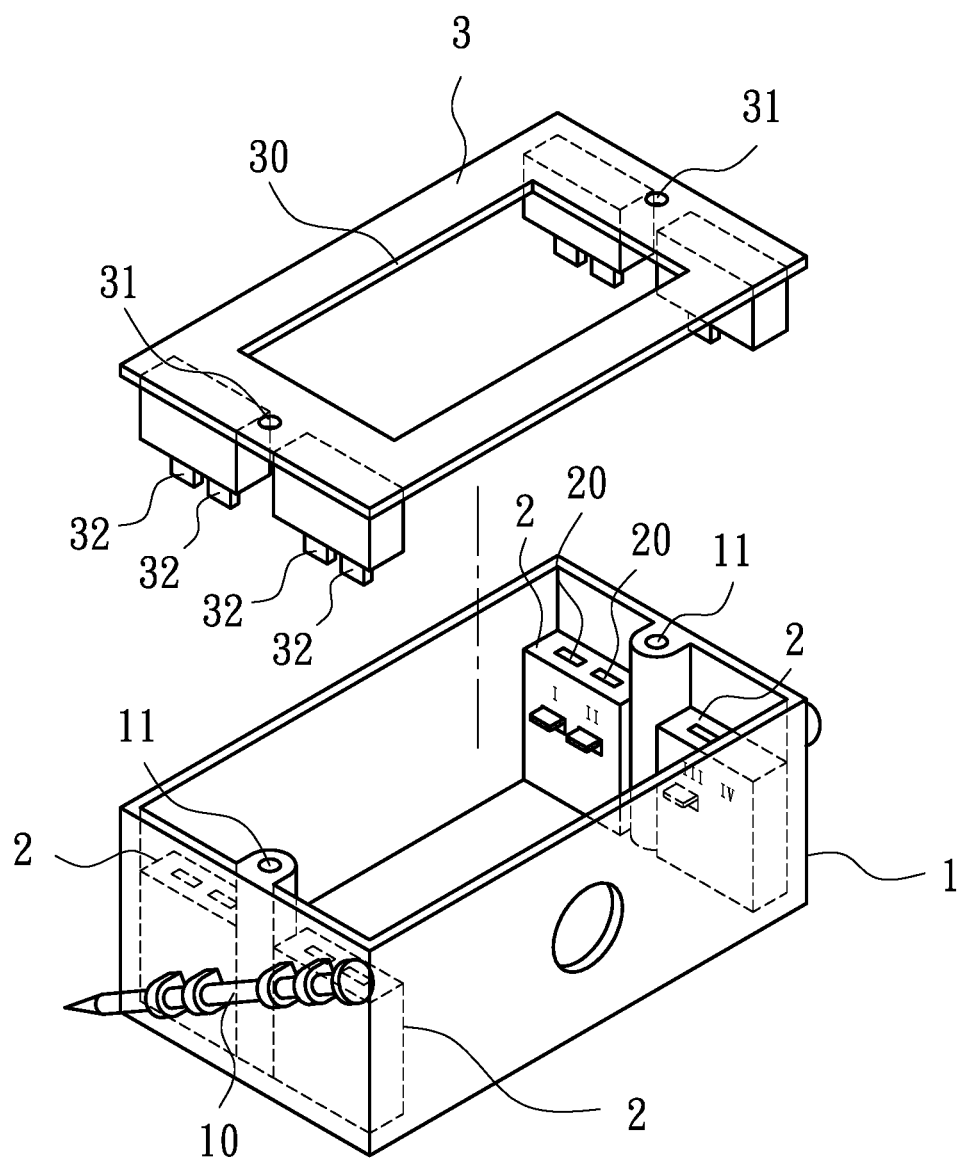
FIG. 2 is a perspective view illustrating the interior of the box container and the box cover.

Referring to both FIG. 1 and FIG. 2, these two figures illustrate the exterior and the interior of the box container and the box cover in a preferred embodiment.

In the embodiment, present invention basically comprising a rectangular box container 1 and a corresponding box cover 3. There are seven wire connectors 2 set on the shorter side walls inside the box container 1, six of the wire connectors 2 are set as three couples which are disposed at three of the four corners of the box container 1 respectively, and the rest of the wire connector 2 is disposed singly at the rest corner. Each of the wire connector 2 has a first opening 20 on the top and a second opening on the lateral side which is presently enclosed by a compress unit. The compress unit can be pressed to release from outside of the wire connector 2, then the second opening is temporarily open for insertion of external wires. The external wires can be live wires, null wires or ground wire, based on the choice of the user.

There are totally roman numerals marked on the inner side wall to indicate where the wire connectors 2 are located, each one can be considered as a port. It can be seen from the figures that the ports I and II are a couple of wire connectors 2, port III is the single wire connector 2. Port IV is an unavailable port since there is set with no wire connector. The rest of two couples of wire connectors 2 can be expected as marked as ports V, VI, VII and VIII respectively, which cannot be seen from the figures because of the limitation of view.

The box container 1 further has a circular opening on the longer side wall, which is provided for external wires to input into the junction box. The external wires can be pulled through the circular opening then be connected to the wire connectors 2. The box container 1 further provides two tapped holes 11 on the top of its frame, which are used to accommodate screws. Additionally, in this embodiment, there are two tall nails 10 set outside the box container 1, these two tall nails 10 can be driven into external surface for securing the box container 1.

The box cover 3 shown in FIG. 1 and FIG. 2 is a frame part having a rectangular opening 30 in the center, the rectangular opening 30 is disposed for accommodating a function module of the box cover 3. Two tapped holes 31 are set on the shorter side on the frame of the box cover 3, these tapped holes 31 are disposed to pair to the two tapped holes 11 on the box container 1 respectively. When the box cover 3 is correctly mounted on the box container 1, the user can drive and fasten screws into the tapped holes 11 through the corresponding tapped holes 31 for restraining the entire box from falling apart.

There are four blocks set on the downside of the frame of the box cover 3 and each of them is extended with at least a contact pin. Three of the blocks are extended with a couple of contact pins 32 and the rest block is extended with a single contact pin 32. There are totally seven contact pins 32 set on these blocks since the arrangement is set to match the arrangement of the seven first openings 20 of the wire connectors 2. The block with the single contact pin 32 is set to match the first opening 20 of port III and the enclosed port IV, and the rest blocks are precisely set to match the rest of first openings 20. The settlement is provided for preventing inadvertent error since the box cover 3 cannot be correctly mounted on the box container 1 if the user does not match the singly set contact pin 32 to the first openings 20 of port III when assembling. For instance, if the user mounts the box cover 3 to the box container 1 from the opposite direction, the unavailable port IV would block the contact pin 32 which is set to match port V from entering, it can be seen from the outside that apparently the junction box is misassembled.

Figure 3:
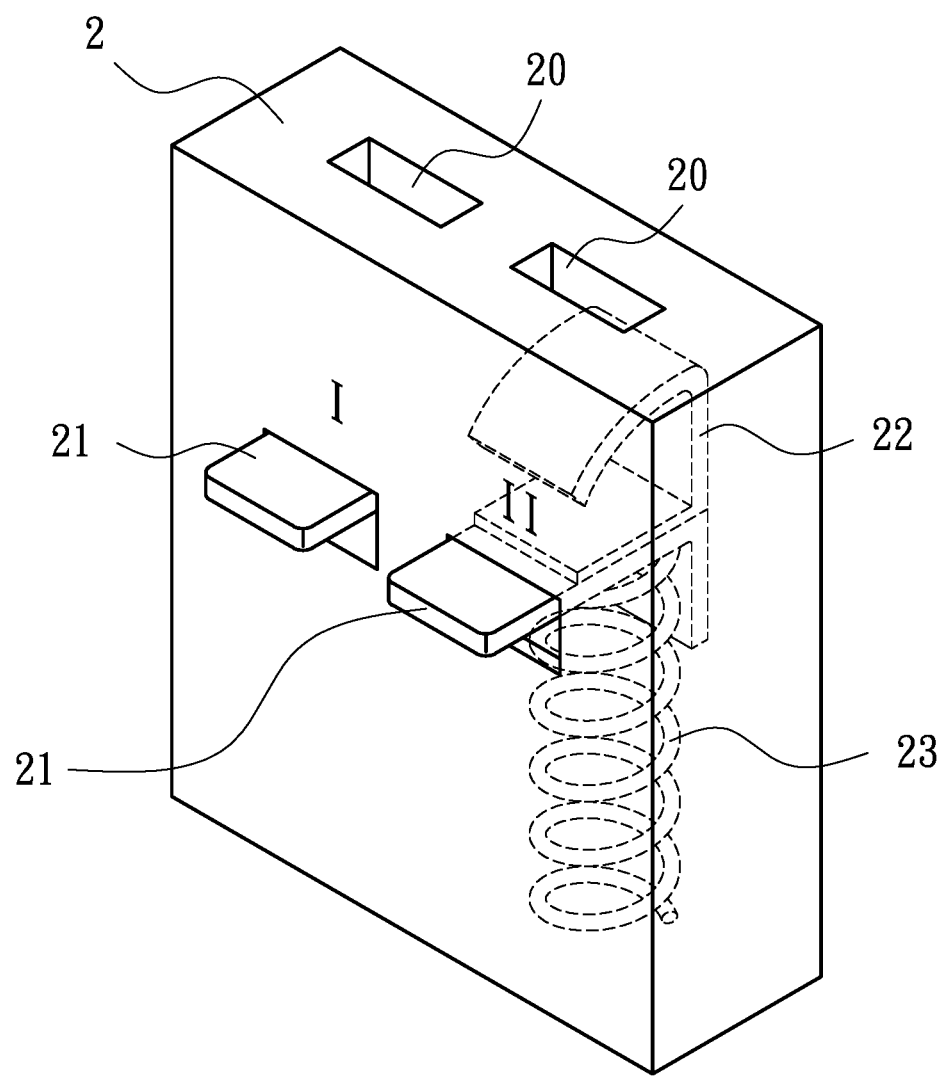
FIG. 3 is a partial perspective view illustrating the exterior and partial interior of the wire connectors.

Referring to FIG. 3, a figure showed the partial perspective view of the exterior and partial interior of the wire connectors. The figure showed the couple of wire connector 2 which occupied ports I and II in FIG. 1 and FIG. 2. It can be seen from the figure that each of the wire connector 2 comprises three units inside its container, which are a compress unit 21, a conducting unit 22 and a spring 23.

The conducting unit 22 is a flexible metal part (or electrical conductive material) fixed close to the first opening 20 of the wire connector 2. When a contact pin 32 inserted from the first opening 20, the conducting unit 22 would be pressed and bended, and the edge of the conducting unit 22 can attach to a side of the contact pin 32. The spring 23 is set to support and provide pressure to the compress unit 21, parts of the compress unit 21 is extended through the second opening of the wire connector 2 so that the user can release the compression of the compress unit 21 from outside.

When the user press the extension part of the compress unit 21, the second opening of the wire connector 2 is temporarily opened for the insertion of an end of an external wire. After that, the user can release the extension part of the compress unit 21; the compress unit 21 would be pressured by the spring 23 and further clamp the end of the external wire with the conducting unit 22 tightly. Moreover, the compress unit 21 can further have a conducting base set on the non-extended part, which is produced by electrical conductive material for increasing the electrical conductivity between the external wire and the conducting unit 22.

Figure 4:
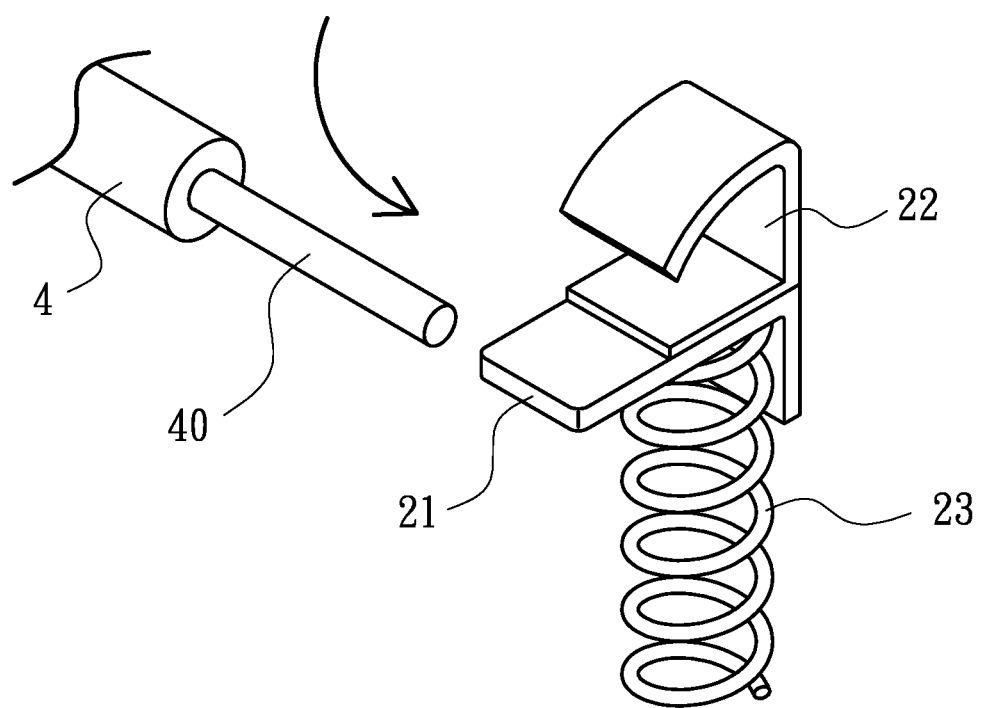
FIG. 4 is a schematic diagram illustrating how a wire connector clamping an external wire.

Then referring to FIG. 4, it is a schematic diagram illustrating how a wire connector clamping an external wire. The outer container of the wire connector 2 is not shown in this figure. When the user presses the extension part of the compress unit 21, the compress unit 21 would temporarily leave the bottom of the conducting unit 22 and provide a space for accommodating the end 40 of the external wire 4. Then the user can input the end 40 of the external wire 4 into the space and release the compress unit 21, the compress unit 21 would be pushed by the spring 23 then clamp the end 40 between the compress unit 21 and the conducting unit 22. Therefore a conduct pathway from the external wire 4 to the inserted contact pin 32 through the conducting unit 22 can be built.

Referring to FIG. 5A, FIG. 5B, FIG. 5C and FIG. 5D, each of them is a schematic diagram showing an option of the function module set on the box cover. The function module of present invention is a changeable module subject to the function that the user required. The function module can be embedded on the frame of the box cover and electrically connected to the contact pins on the frame according to the function of the function module. The user just need to connect the box container with the external wires as the plan and mount the box cover on the wired box container, then the function module would be available since the circuit between the function module and the external wires is built.

Figure 5A:
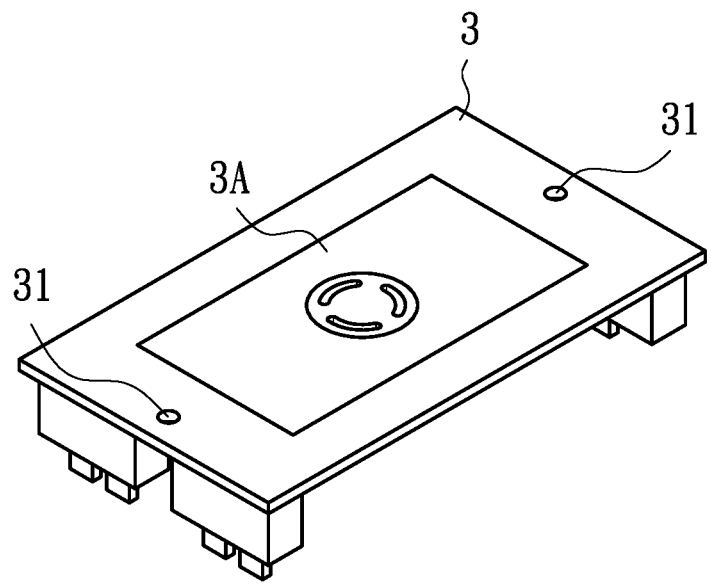
FIG. 5A to 5D are schematic diagrams showing options of the function module set on the box cover.

FIG. 5A showed a box cover 31 embedded with a 220 voltage plug socket module 3A, the 220 voltage plug socket module 3A should be electrically connected to the contact pins correspond to the wire connectors of two 110V live wire and the wire connector of a ground wire.

Figure 5B:
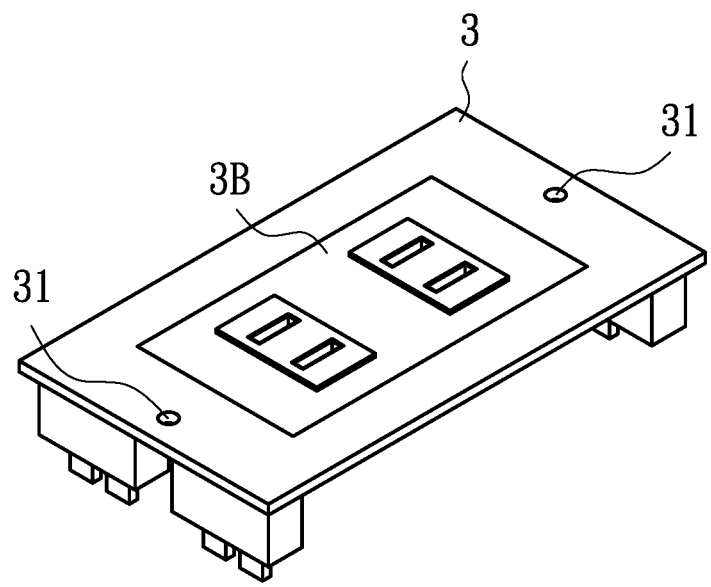

FIG. 5B showed a box cover 31 embedded with a double 110 voltage plug socket module 3B, the double 110 voltage plug socket module 3B should be electrically connected to the contact pins correspond to the wire connectors of a 110V live wire and a null wire.

Figure 5C:
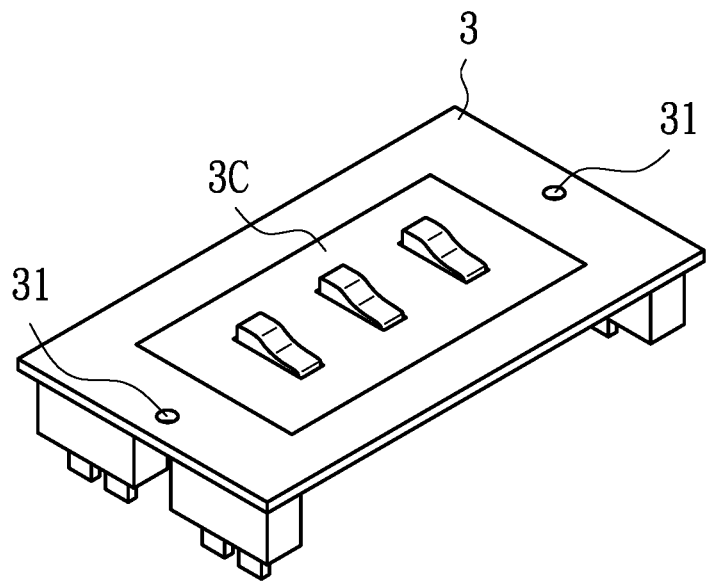

FIG. 5C showed a box cover 31 embedded with a triple switch module 3C, the triple switch module 3C should be electrically connected to the contact pins correspond to the wire connectors of a 110V live wire and three null wire.

Figure 5D:
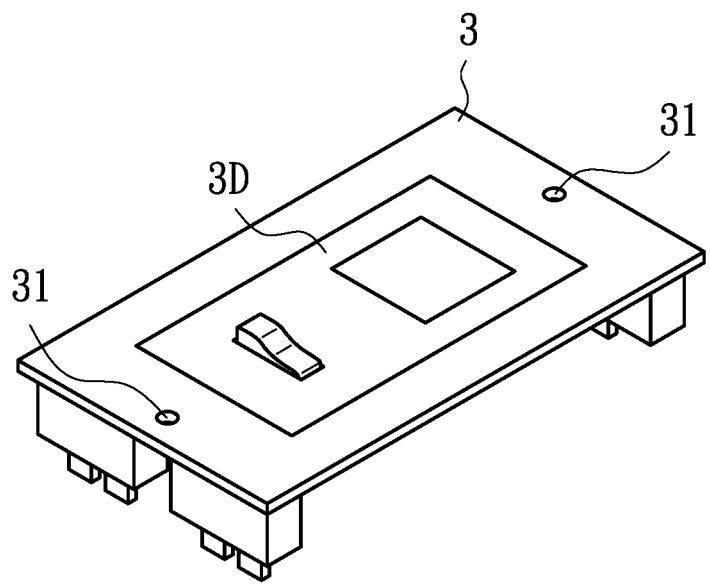

FIG. 5D showed a box cover 31 embedded with a light sensing module 3D, the light sensing module 3D should be electrically connected to the contact pins correspond to the wire connectors of a 110V live wire and a null wire.

The modularized junction box of present invention is provided as a universal junction box. The junction box just need to be set on the wall and wired once, then the function of the junction box can be changed by replacing the box cover and the function module, which is much convenient than conventional junction boxes.

Present invention is a junction box which is universally applicable. FIG. 6A-6I showed nine selected function modules of an embodiment junction box. The junction box of the embodiment is wired as follows: The wire connector of port I is connected with a 110V live wire. The wire connector of port II is connected with a null wire as a common terminal. The wire connector of port III is connected with a 110V live wire. The wire connector of port V, VI or VII is connected with a null wire respectively. The wire connector of port VIII is connected with a ground wire. For a user who likes to change the function of the junction box, it can be simply accomplished by replacing the box cover with another one having different function instead of rearranging the wiring of the junction box.

Figure 6A:
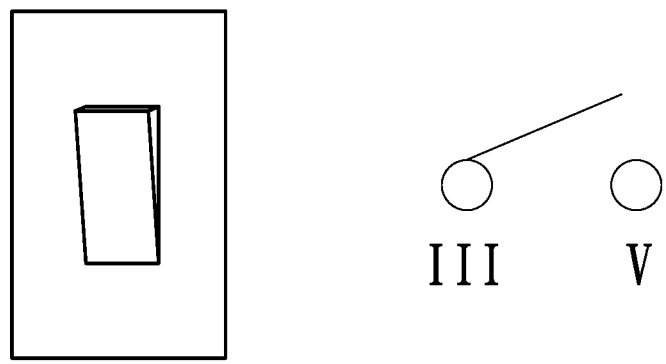
FIG. 6A to 6I are schematic diagrams showing selected function modules of a junction box embodiment.

FIG. 6A showed a single switch module provided for said embodiment, wherein an end of the switch connects to the contact pin for matching port III and the other end of the switch connects to the contact pin for matching port V. Therefore, once the single switch being turned on, it bridges the input of the 110V wire of port III to the null wire of port V.

Figure 6B:
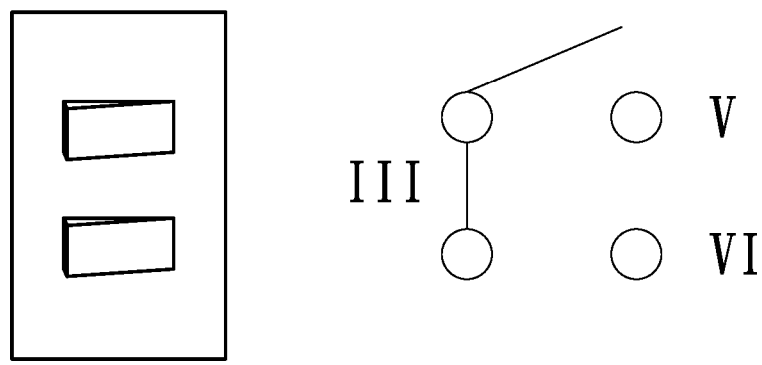

FIG. 6B showed a double switch module provided for said embodiment, wherein one end of the two switches connects to the contact pins for matching port III, and the opposite end of the two switches connects to the contact pin for matching port V and port VI respectively. When each of the switches being turned on, it bridges the input of the 110V wire of port III to the null wire of its corresponding port.

Figure 6C:
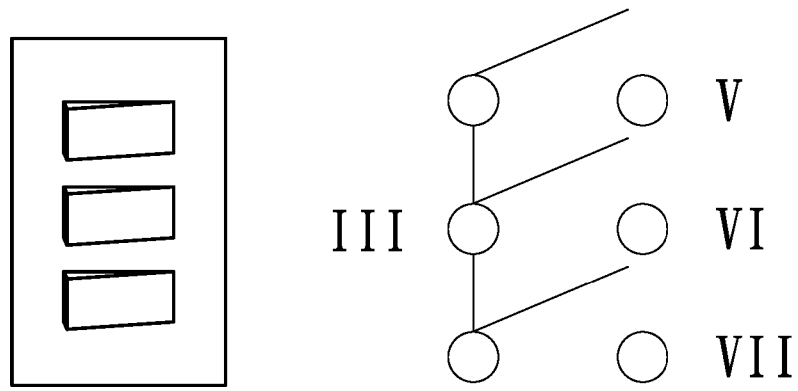

FIG. 6C showed a triple switch module provided for said embodiment, wherein one end of the three switches connects to the contact pins for matching port III, and the opposite end of the three switches connects to the contact pin for matching port V, port VI and port VII respectively. When each of the switches being turned on, it bridges the input of the 110V wire of port III to the null wire of its corresponding port.

Figure 6D:
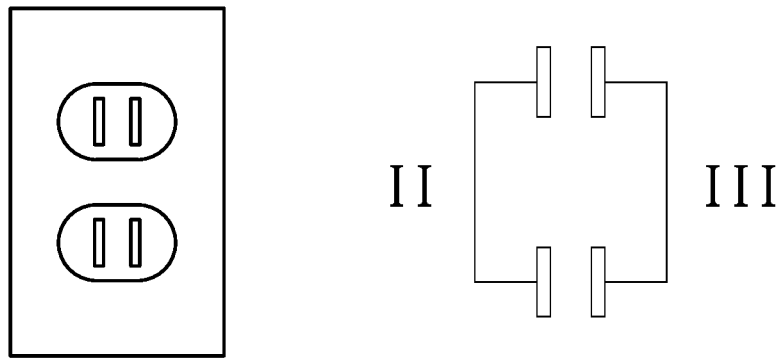

FIG. 6D showed a double socket module provided for said embodiment, wherein an end of the two sockets connects to the contact pin for matching port II and the other end of the two sockets connects to the contact pin for matching port III. Therefore, once a socket being plugged, it bridges the input of the 110V wire of port III through the appliance to the common terminal of port II.

Figure 6E:
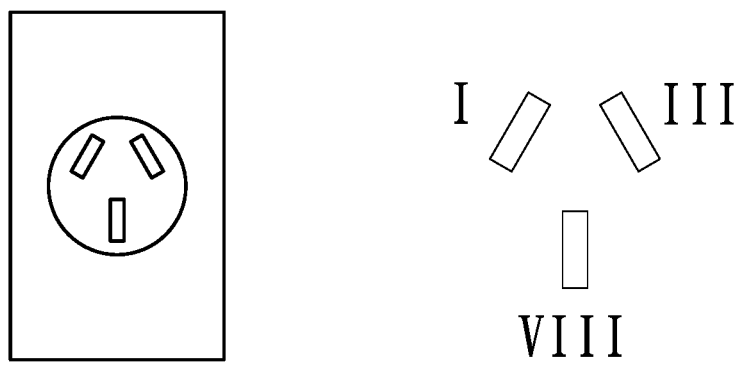

FIG. 6E showed a 220V socket module provided for said embodiment, wherein a socket end connects to the 110V wire of port I, another socket end connects to the 110V wire of port III, and the rest of the socket end connects to the ground wire of port VIII.

Figure 6F:
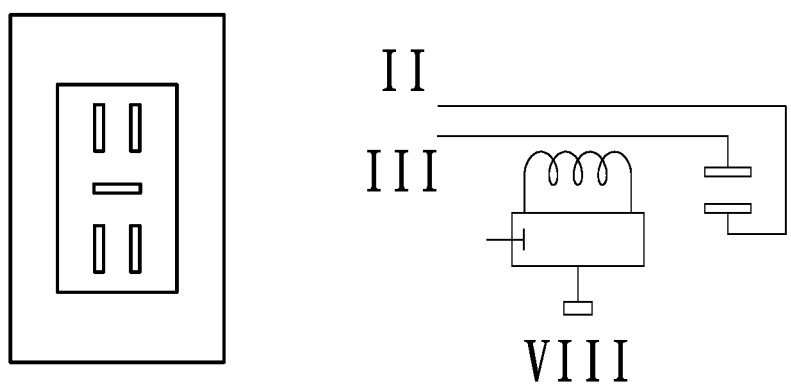

FIG. 6F showed a ground fault circuit interrupter socket module provided for said embodiment, wherein an end of the socket connects to the 110V wire of port III, another end of the socket connects to the common terminal of port II, and an electrical inductor in the module connects to the ground wire of port VIII. The electrical inductor is provided for leakage preventing.

Figure 6G:
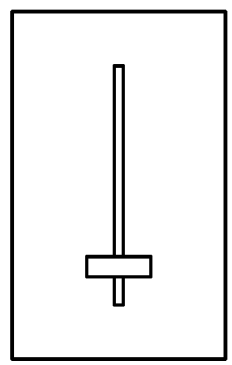
Figure 6G:
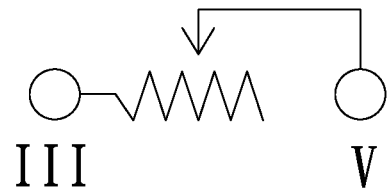

FIG. 6G showed a slide switch module provided for said embodiment, the slide switch module having a variable resistor, wherein an end of the variable resistor connects to the contact pin for matching port III and the other end of the variable resistor connects to the contact pin for matching port V. The variable resistor of the slide switch provides the function for adjusting the current from the 110V wire of port III to the null wire of port V.

Figure 6H:
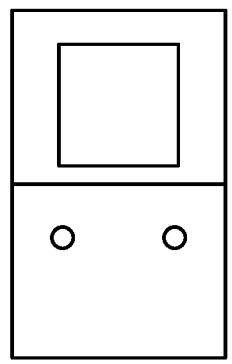
Figure 6H:
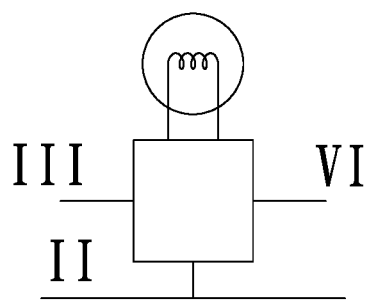

FIG. 6H showed a sensing switch module provided for said embodiment, wherein an end of the sensor connects to the contact pin for matching port III and the other end of the sensor connects to the contact pin for matching port V. The sensor is also connected to the common terminal of port II for automatically sensing and controlling the connected appliance.

Figure 6I:
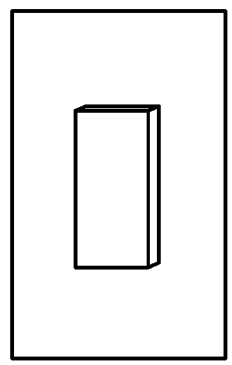
Figure 6I:
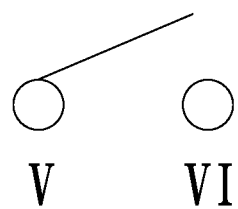

FIG. 6I showed a press switch module provided for said embodiment, wherein an end of the press switch connects to the contact pin for matching port III and another end of the press switch connects to the contact pin for matching port V. Therefore, once the press switch being turned on, it bridges the input of the 110V wire of port III to the null wire of port V.

Figure 7:
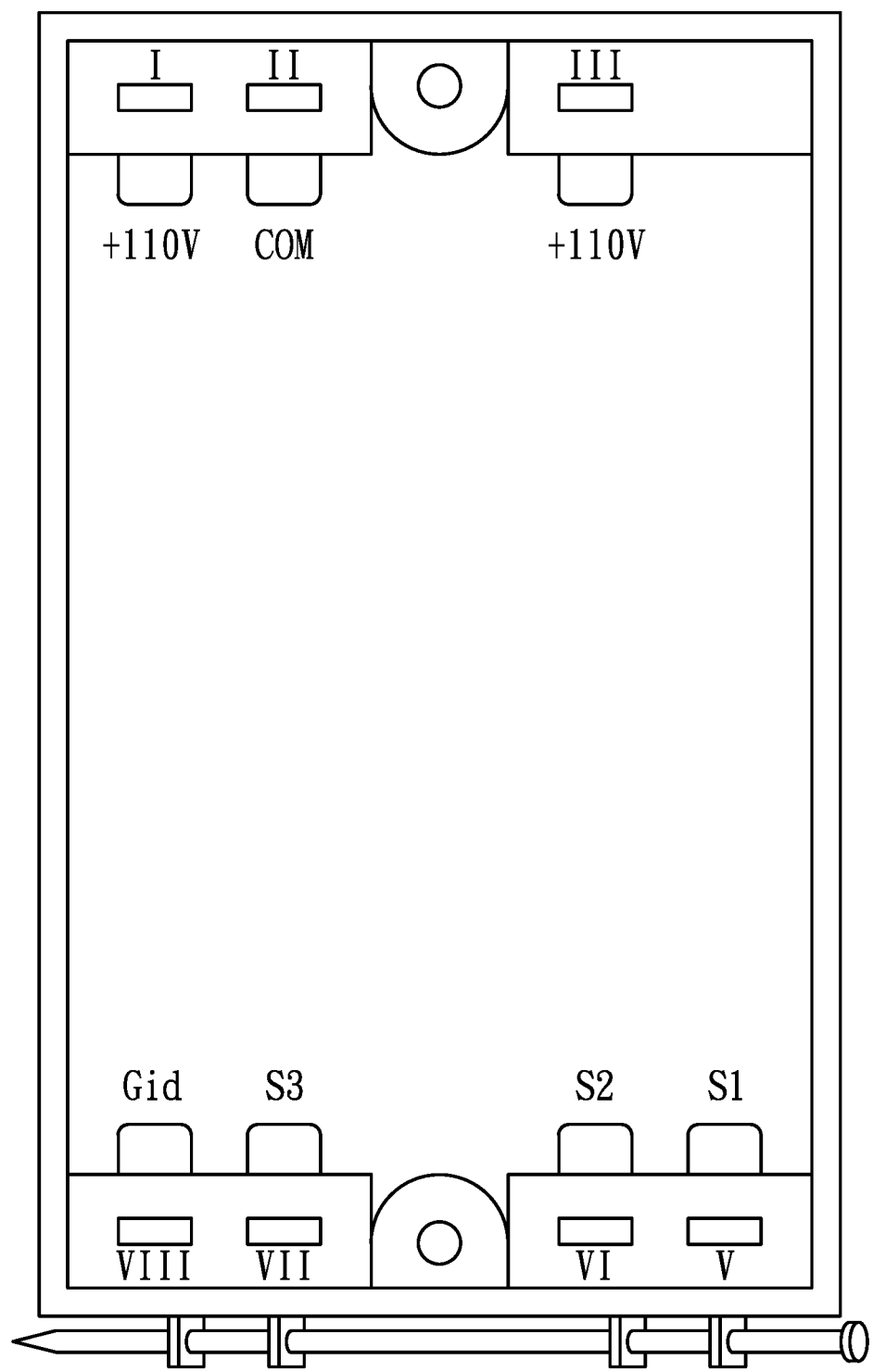
FIG. 7 showed the above view of the box container of a junction box embodiment.

FIG. 7 showed the above view of the box container of the embodiment, it can be seen that three wire connectors (port I, port II, port III) are set on a side wall of the box container, wherein port I and III are prepared for connecting two 110V wires respectively, port II is prepared as the common terminal. The opposite side wall of the box container is set with another four wire connectors (port V, port VI, port VII, port VIII), wherein the port V, port VI, port VII are prepared for connecting three null wires respectively, and the port VIII is provided for connecting the ground wire. The space next to port III is completely sealed to prevent the box cover being incorrectly mounted on the box container. Once the wiring process is accomplished according to the arrangement as above, it can be used permanently except that the wires are invalid. The function of the junction box can be simply changed by replacement of the box cover with a different function module.

The descriptions above are examples of preferred embodiments for better understanding, which do not restrict the scope of present invention. Any equivalent change or modification without departing from the scope thereof should be covered in claims herein. It can be seen from above descriptions that presented junction box and the wire connectors can be considered as innovative inventions that meet the patentability.

What is claimed is:
1. A junction box, comprising:
a box container providing at least one opening on the surface for input of plurality of external wires;
a plurality of wire connectors positioned inside the box container, wherein each of the wire connector has a first opening and a second opening, wherein each of the second openings is provided for accommodating one of the external wires;
a box cover provided for being mounted on the box container, wherein a plurality of contact pins are set on the inner side of the box cover and correspondingly positioned for being inserted into the first openings of the wire connectors;
a function module on or embedded in the box cover and selectively connected with the contact pins according to selected function;
wherein each of the wire connector is disposed for electrically connecting the contact pin inserted from the first opening with one of the external wires inserted from the second opening when the box cover is mounted on the box container;
wherein the positions of the wire connectors are set to match the positions of the contact pins for preventing inadvertent mounting error;
wherein each of the wire connector includes a compress unit, and the compress unit includes a spring disposed for providing pressure to the compress unit.

2. A junction box as claim 1, wherein the function module is a module of single switch module, multiple switch, light detecting switch, sound detecting switch, ground fault circuit interrupter switch, time switch, slide switch, press switch, touch switch, turn switch or plug socket.

3. A junction box as claim 1, wherein each of the wire connector includes:
a container, on which the first opening and the second opening are set;
a conducting unit inside the container, wherein the first opening is provided to accommodate an external contact pin for contacting with the conducting unit;
wherein the compress unit inside the container is provided for clamping part of the conducting unit with an end of the external wire inserted from the second opening so as to electrically connect the external wire with the contact pin via the conducting unit.

4. A junction box as claim 1, wherein the compress unit includes an extension part extending through the second opening, which is provided for releasing the compress unit from outside of the container.

5. A junction box as claim 1, wherein the compress unit includes a conducting base, which is disposed for increasing the conductivity between the end of external wire with the conducting unit.

6. A wire connector, comprising:
a container having a first opening and a second opening on the surface;
a conducting unit disposed inside the container, wherein the first opening of container is disposed to accommodate an external contact pin for contacting with the conducting unit;
a compress unit disposed inside the container, wherein the compress unit is provided for clamping part of the conducting unit with an end of external wire inserted from the second opening so as to electrically connect the external wire with the external contact pin via the conducting unit;
wherein the compress unit includes a spring disposed for providing pressure to the compress unit.

7. A wire connector as claim 6, wherein the compress unit includes an extension part extending through the second opening, which is provided for releasing the compress unit from outside of the container.

8. A wire connector as claim 6, wherein the compress unit includes a conducting base, which is disposed for increasing the electrical conductivity between the end of external wire and the conducting unit.

9. A junction box, comprising:
a box container providing at least one opening on the surface for input of plurality of external wires;
seven wire connectors positioned inside the box container, wherein each of the wire connector has a first opening and a second opening, wherein each of the second openings is provided for accommodating one of the external wires;
a box cover provided for being mounted on the box container, wherein seven contact pins are set on the inner side of the box cover and correspondingly disposed to match the positions of the seven wire connectors;
wherein each of the contact pin is disposed for being inserted into the first openings of the wire connectors;
a function module on or embedded in the box cover and selectively connected with the contact pins according to selected function;
wherein each of the wire connector is disposed on two side walls of the box container, four on a side and the other three on the opposite side;
wherein each of the wire connector is disposed for electrically connecting the contact pin inserted from the first opening with one of the external wires inserted from the second opening when the box cover being mounted on the box container;
wherein the positions of the wire connectors are set match to the positions of the contact pins for preventing inadvertent mounting error;
wherein each of the wire connector includes a compress unit, and the compress unit includes a spring disposed for providing pressure to the compress unit.

10. A junction box as claim 9, wherein the function module is a module of single switch module, multiple switch, light detecting switch, sound detecting switch, ground fault circuit interrupter switch, time switch, slide switch, press switch, touch switch, turn switch or plug socket.

11. A junction box as claim 9, wherein each of the wire connector includes:
a container, on which the first opening and the second opening are set;
a conducting unit inside the container, wherein the first opening is provided to accommodate an external contact pin for contacting with the conducting unit;
wherein the compress unit inside the container is provided for clamping part of the conducting unit with an end of the external wire inserted from the second opening so as to electrically connect the external wire with the contact pin via the conducting unit.

12. A junction box as claim 9, wherein the compress unit includes a conducting base, which is disposed for increasing the conductivity between the end of external wire with the conducting unit.

* * * * *